United States Patent
Halabian et al.

(10) Patent No.: US 10,904,774 B2
(45) Date of Patent: Jan. 26, 2021

(54) SYSTEM AND METHOD FOR SERVICE DIFFERENTIABLE RADIO RESOURCE MANAGEMENT FOR WIRELESS LOCAL AREA NETWORKS

(71) Applicant: Telefonaktiebolaget LM Ericsson (publ), Stockholm (SE)

(72) Inventors: Hassan Halabian, Ottawa (CA); Afshin Sahabi, Kanata (CA); Mike Skof, Nepean (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/340,484

(22) PCT Filed: Oct. 20, 2017

(86) PCT No.: PCT/IB2017/056548
§ 371 (c)(1),
(2) Date: Apr. 9, 2019

(87) PCT Pub. No.: WO2018/073808
PCT Pub. Date: Apr. 26, 2018

(65) Prior Publication Data
US 2019/0246293 A1 Aug. 8, 2019

Related U.S. Application Data

(60) Provisional application No. 62/410,920, filed on Oct. 21, 2016.

(51) Int. Cl.
*H04W 24/02* (2009.01)
*H04W 24/10* (2009.01)
(Continued)

(52) U.S. Cl.
CPC .......... *H04W 24/02* (2013.01); *H04W 24/10* (2013.01); *H04W 72/0446* (2013.01);
(Continued)

(58) Field of Classification Search
None
See application file for complete search history.

(56) References Cited

U.S. PATENT DOCUMENTS

| 9,544,798 | B1 * | 1/2017 | Ahmadzadeh .... | H04W 12/1202 |
| 2015/0341939 | A1 * | 11/2015 | Sharma .............. | H04W 52/243 370/329 |
| 2016/0374030 | A1 * | 12/2016 | Koutsimanis ....... | H04W 52/343 |

FOREIGN PATENT DOCUMENTS

| EP | 2 403 296 A1 | 1/2012 |
| WO | WO 2013/152305 A1 | 10/2013 |
| WO | WO 2015/141177 A1 | 9/2015 |

OTHER PUBLICATIONS

International Search Report and Written Opinion of the International Searching Authority, PCT/IB2017/056548, dated Jan. 5, 2018, 12 pages.

* cited by examiner

Primary Examiner — Anh Ngoc M Nguyen
(74) Attorney, Agent, or Firm — Sage Patent Group

(57) ABSTRACT

A method and node for providing service differentiable radio resource management, RRM, in a wireless communication network are provided. According to one aspect, a method includes defining access point, AP, priority factors based on predefined criteria. The method further includes performing an RRM optimization based on the priority factors, the optimization providing a measure of service to an AP that depends on a priority factor associated with the AP. The method also includes sending configuration data to the APs based on the RRM optimization.

16 Claims, 5 Drawing Sheets

(51) Int. Cl.
*H04W 72/04* (2009.01)
*H04W 72/10* (2009.01)
*H04W 80/02* (2009.01)
*H04W 84/12* (2009.01)
*H04W 84/18* (2009.01)

(52) U.S. Cl.
CPC ........... *H04W 72/10* (2013.01); *H04W 80/02* (2013.01); *H04W 84/12* (2013.01); *H04W 84/18* (2013.01)

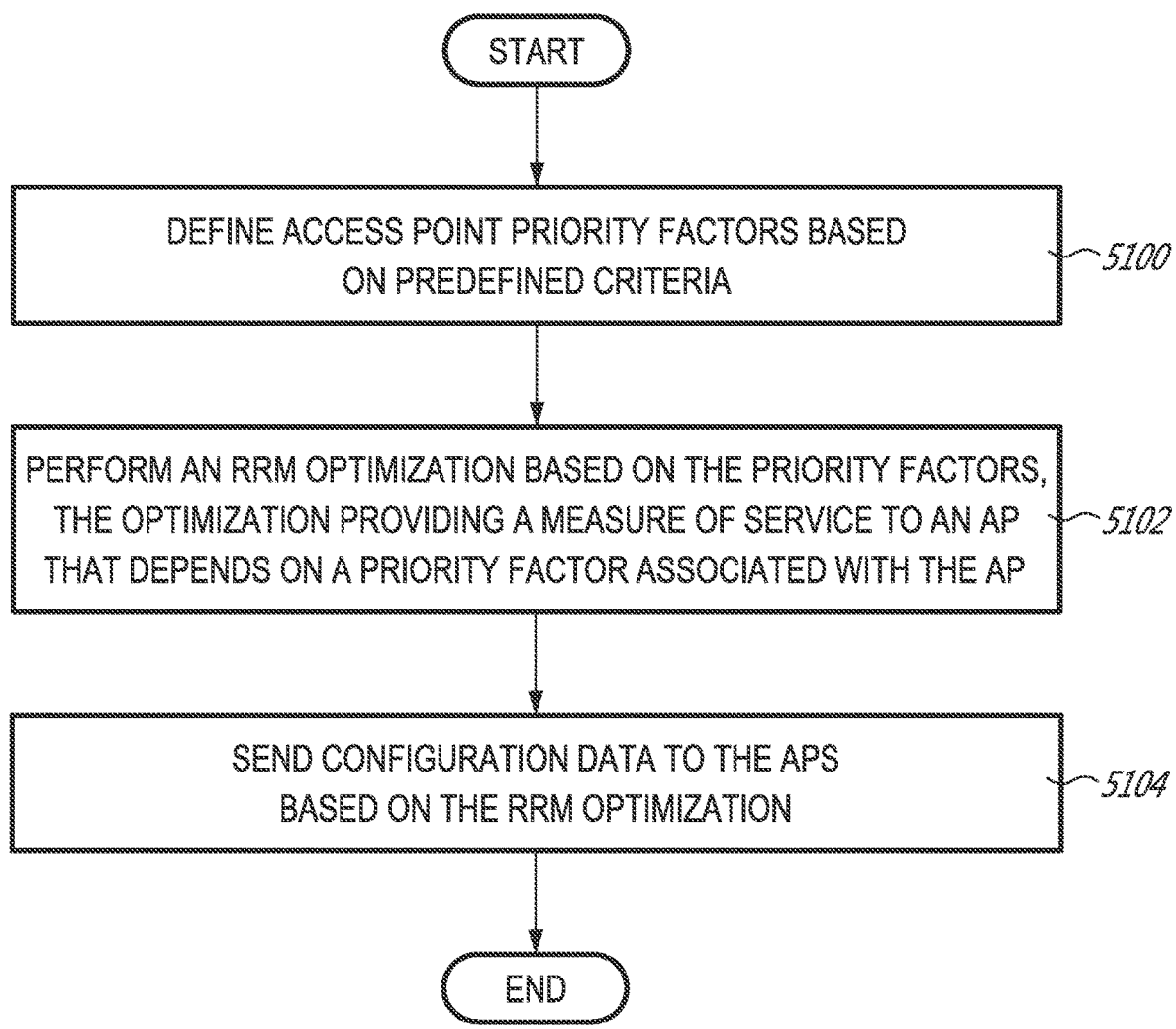

SYSTEM AND METHOD FOR SERVICE DIFFERENTIABLE RADIO RESOURCE MANAGEMENT FOR WIRELESS LOCAL AREA NETWORKS

This application is a 35 U.S.C. § 371 national stage application of PCT International Application No. PCT/IB2017/056548 filed on Oct. 20, 2017, which in turn claims domestic priority to U.S. Provisional Patent Application No. 62/410,920, filed on Oct. 21, 2016 the disclosures and content of which are incorporated by reference herein in their entirety.

TECHNICAL FIELD

This disclosure relates to wireless communications, and in particular, to service-differentiable radio resource management (RRM) for wireless local area networks (WLAN).

BACKGROUND

Wireless local area networks (WLAN) provide short range (local) wireless access to the network users based on IEEE 802.11 standards. The IEEE 802.11 standard s define two modes of network access for WLAN clients namely, ad hoc and infrastructure modes. While in the ad hoc mode, wireless stations connect to each other in a peer-to-peer fashion, in the infrastructure mode, the wireless connectivity is provided by using wireless access points (AP). The infrastructure mode is the more appropriate mode for providing Internet access to the wireless users (non-AP stations). In this mode, the APs are responsible for distribution of Internet access to the users. Most of the WLAN networks deployed by the Internet providers are working in the infrastructure mode. In some embodiments of this disclosure, WLAN operation in the infrastructure mode is assumed.

A WLAN is composed of a set of Basic Service Sets (BSSs) which is defined as one AP with its associated clients (users). Each BSS is known by a BSSID (BSS Identifier) which is the MAC address of the AP in the BSS. An Extended Service Set (ESS) is a set of connected BSSs. The APs in an ESS are connected through a common distribution system. Each ESS has an ID which is called SSID (Service Set Identifier). WLAN Internet providers deploy their network by deploying the ESSs (BSSs) over the desired coverage area. For example, all the APs (BSSs) in a shopping center with the same SSID build the ESS for the shopping center. A service provider provides Internet access to its clients through the deployed ESSs.

As noted, WLANs are operating based on IEEE 802.11 standards and therefore they are called 802.11 WLANs. The IEEE 802.11 standards define the PHY (Physical) and MAC (Medium Access Control) specification for the WLAN stations (AP and users). The performance of the access from the AP to the clients is controlled by changing the PHY and MAC layer parameters and functionalities in the AP and also in the wireless device users. In one BSS, the AP is responsible for controlling and optimizing the PHY and MAC layer parameters. The AP can do this based on the local information from the BSS. Examples of MAC and PHY layer parameters and functionalities include operating channel, transmission power, rate adaptation, beacon rate and power, etc., while the MAC and PHY performance optimization can be distributed or done locally by each AP in each BSS.

Another strategy is to perform the network optimization globally and centrally over all the BSSs. The latter methodology provides a centralized network management arrangement for optimizing WLAN networks. Note that a centralized solution should result in a better network-wide performance optimization rather than the distrusted method. This is due to the fact that a centralized solution will take the correlation and impacts of BSSs into account for network optimization. Therefore, centralization will result in a better network resource allocation.

To clarify this issue, consider for example the problem of channel allocation in WLAN networks. In a local channel selection scheme, each AP chooses an operating channel based on the RSSI (received signal strength identifier) on each channel. For instance it chooses the channel with the least RSSI. In this local channel selection scheme, an AP does not have the RSSI observed by other APs and the AP only acts based on its local information. The channel selected by the AP might improve its BSS performance but it might also deteriorate the performance of the neighboring BSSs.

The channel changes in the neighboring BSSs can also affect the performance of a reference BSS. This behavior may not result in a global optimal channel allocation to the BSSs in an RF neighborhood. Local channel allocation might also result in channel changes being caught in a loop. A better approach is to collect all required information over all BSSs and then in a central node select the best channel plan for the network. A centralized channel selection will consider the impact of all the BSSs on each other. In WLAN networks, transmissions of co-channel BSSs impact each other either by collisions or by adding interference to the received signal. Furthermore co-channel APs should share the channel-time fairly. Considering all these effects, it may be concluded that a central channel selection can provide a better and more robust channel plan for the network.

Recently, Wi-Fi Internet providers have shown their interest in developing Self-Organizing Network (SON) managers for controlling and optimizing their WLAN networks. A SON manager is responsible for optimizing the PHY and MAC layer parameters and network settings of the BSSs in a WLAN. The primary goal of a Wi-Fi manager node is to provide efficient and vendor agnostic Wi-Fi radio resource management services in the presence of a large and dynamically changing number of APs over various traffic conditions.

A vendor agnostic Wi-Fi SON manager is configured to run a number of Wi-Fi radio resource management (RRM) algorithms by reading some input parameters from the network and writing the output parameters (Wi-Fi RRM configuration settings) into the APs in the network. The inputs and outputs of these algorithms should be supported and be available in all the APs in the WLAN network. The Wi-Fi RRM configuration settings include PHY layer parameters, e.g., power, channel, channel bandwidth, MIMO and MU-MIMO configuration, data rate, etc. and also MAC layer parameters, e.g., CSMA/CA settings, clear channel assessment threshold, throughput, load balancing, traffic scheduling, QoS parameters, security parameters, association and disassociation parameters, etc. A manager node might be placed in a cloud server to provide cloud-based SON service to the WLAN. A manager node not only provides RRM services but also can be used for performance monitoring and management purposes.

There are the following problems with the existing Wi-Fi RRM solutions:

They are not scalable to large number of APs since they are controller based solutions.

There is not quality of service differentiation support on different APs of the network.

They are reactive solutions rather than being proactive. This limits these approaches to work only over small networks (less than hundreds of APs).

Most of the current reactive solutions are not vendor agnostic.

Most of the current reactive solutions rely on using Wi-Fi controller nodes.

The optimization decisions in such solutions might be disruptive to customer methods.

SUMMARY

Some embodiments advantageously provide a method and system for providing service differentiable radio resource management, RRM, in a wireless communication network. According to one aspect, a method includes defining access point, AP, priority factors based on predefined criteria. The method further includes performing an RRM optimization based on the priority factors, the optimization providing a measure of service to an AP that depends on a priority factor associated with the AP. The method also includes sending configuration data to the APs based on the RRM optimization.

According to this aspect, in some embodiments, the method also includes receiving survey data from a plurality of APs, determining a predictive periodic behavior of the wireless communication network. In such embodiments, the RRM optimization is further based on the survey data and the predictive periodic behavior. In some embodiments, the predefined criteria includes at least one of service class, annual seasons, special events, AP hardware, AP software version, standard specifications, environmental factors, logistic and organizational policies. In some embodiments, the RRM optimization includes one of minimizing a cost function and maximizing a revenue function over a plurality of APs based on the priority factors and traffic load information. In some embodiments, the traffic load information is estimated for at least one AP not managed by an operator hosting the manager node. In some embodiments, the estimation of traffic load information for an AP is based on at least one of an average of traffic load information of other APs, and a maximum load of another AP, for which traffic load information is determinable. In some embodiments, a blacklist of APs for which RRM configuration changes are not allowed is maintained. In some embodiments, the node is a self-organizing, SON, manager node.

According to another aspect, a manager node configured to provide service differentiable radio resource management, RRM, in a wireless communication network is provided. the node includes processing circuitry including a memory and a processor. The memory is configured to store access point, AP, priority factors. The processor is configured to define AP priority factors based on predefined criteria. The processor is further configured to perform an RRM optimization based on the priority factors, the optimization providing a measure of service to an AP that depends on a priority factor associated with the AP. The processor is also configured to send configuration data to the APs based on the RRM optimization.

According to this aspect, in some embodiments, the processor is further configured to receive survey data from a plurality of APs, and determine a predictive periodic behavior of the wireless communication network, wherein the performing the RRM optimization is further based on the survey data and the predictive periodic behavior. In some embodiments, the predefined criteria includes at least one of service class, annual seasons, special events, AP hardware, AP software version, standard specifications, environmental factors, logistic and organizational policies. In some embodiments, the RRM optimization includes one of minimizing a cost function and maximizing a revenue function over a plurality of APs based on the priority factors and traffic load information. In some embodiments, the traffic load information is estimated for at least one AP. In some embodiments, the estimation of traffic load information for an AP is based on at least one of an average of traffic load information of other APs, and a maximum load of another AP, for which traffic load information is determinable. In some embodiments, a blacklist of APs for which RRM configuration changes are not allowed is maintained. In some embodiments, the node is a SON manager node.

According to yet another aspect, a node is configured to provide service differentiable radio resource management, RRM, in a wireless communication network. The node includes a priority factor definition module configured to define AP priority factors based on predefined criteria. The node also includes an RRM optimizer module configured to perform an RRM optimization based on the priority factors, the RRM optimization providing a measure of service to an AP that depends on a priority factor associated with the AP. The node further includes a configuration data interface module configured to send configuration data to the APs based on the RRM optimization.

According to this aspect, the node further includes a data interface module configured to receive survey data from a plurality of APs and a periodic behavior prediction module configured to determine a predictive periodic behavior of the wireless communication network. The RRM optimization is further based on the survey data and the predictive periodic behavior.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 5 is a flowchart of an exemplary process for providing service differentiable RRM in a wireless communication network.

DETAILED DESCRIPTION

Figure 1:
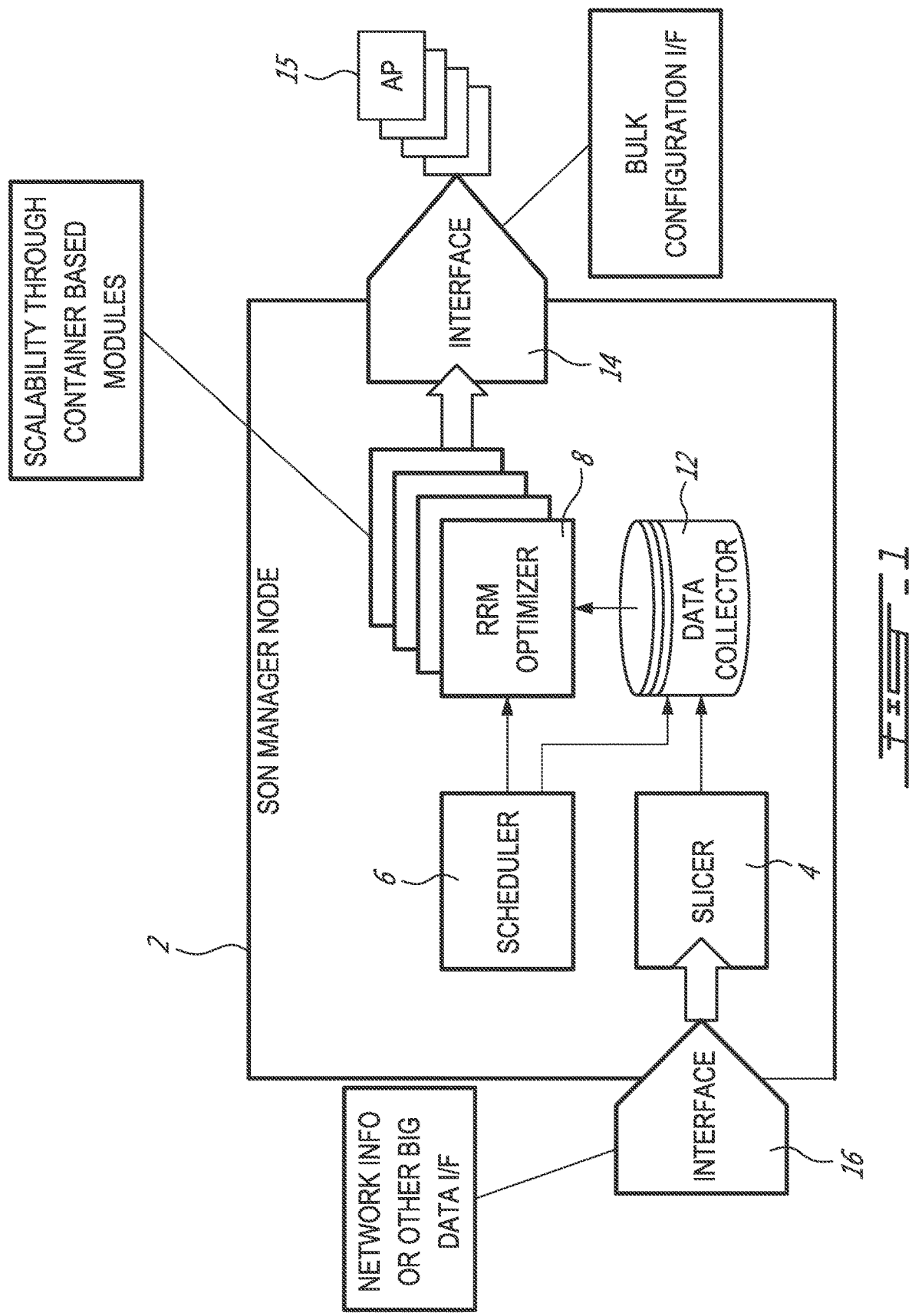
FIG. 1 is a block diagram of a SON manager node.

Before describing in detail exemplary embodiments, it is noted that the embodiments reside primarily in combinations of apparatus components and processing steps related to service-differentiable radio resource management (RRM) for wireless local area networks (WLAN). Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Embodiments provide a vendor agnostic service differentiable RRM arrangement. In contrast to reactive RRM algorithms for Wi-Fi SON manager nodes, some embodiments provide a proactive RRM solution which operates based on predictive and learning principles. This solution uses radio frequency (RF) survey data from each AP as well as the network data (including AP load values, utilizations, capacities, etc.). Using this arrangement, the RRM service quality of different access points in the controlled WLAN network may be differentiated. This gives mobile service operators the capability to provide differentiated service in their Wi-Fi access to their customers. Moreover, RRM solution can differentiate the service based on the type of the access point including the 802.11 standard they are supporting, indoor vs outdoor APs, time based service quality provisioning, etc. The optimization arrangement presented herein is part of the Wi-Fi manager architecture presented in FIG. 1. In the manager architecture in FIG. 1, the RRM optimization algorithms operate and execute in accordance with the arrangement presented herein. In one embodiment, the RRM scheduler 6 optimizes a network by executing RRM threads. Each RRM optimization thread optimizes a network segment at a specified time. Network segments are smaller dense slices of the network which have minimal RF impact on each other.

As noted, the RRM algorithms are executed for r each segment at a scheduled time. The RRM scheduling times are determined by the scheduler algorithm implemented by the scheduler 6. The granularity of the RRM optimization actions is defined as an RRM time-slot. In other words, the RRM time-slot is the minimum difference of two consecutive RRM optimizations. For example, if the RRM optimization is performed hourly the time-slot is defined to be one hour. The idea of a proactive predictive RRM solution arises from the fact that the network behavior of each AP 15 (e.g., number of clients, type and volume of traffic, channel-time usages) has a periodic behavior. More specifically, such a periodic behavior can be observed weekly in different network venues. In other words, the traffic loads of each AP 15 over similar time-slots of different weeks are highly correlated. For instance, the loads of an AP 15 in an enterprise building every Monday at 9 am will be highly correlated. Note that this periodic behavior might have a longer period, e.g., monthly or annually or it might have a shorter period, e.g., daily. Significantly, the input demand of each AP 15 may have a periodic nature with some duration and from this the correlation of each AP's load (demand) in each time-slot over different periods (e.g., every week) is observed. The period of traffic load behavior is referred to herein as the RRM period.

In the RRM solution discussed herein, the latest RF survey data collected from the APs over the network is used as the latest RF snapshot of the network. The term "RF survey" means the RF neighbor vector observed by each AP which contains the received signal strength indicator (RSSI) level of all the neighboring APs irrespective of the operating channel. In the optimization arrangement discussed herein, the latest RF data for each time-slot collected over the network is used. Depending on the capabilities of the SON manager node 2, network interface, and AP 15 capabilities, the RF scans arrive at the SON manager node 2 with some frequency. For instance, RF surveys can be collected hourly from the APs 15.

The optimization arrangement can be fed by any PHY/MAC layer parameters from the APs 15, and/or any network wide or AP wide performance measurement statistics including channel-time utilizations, air interface transmission rate, available per AP capacity, etc. All of these parameters are called network data. For traffic and network data, a predictive approach is used in which the collected network data information for each time-slot may be collected and smoothed, and then the network behavior is predicted for the same time-slot for the next RRM period. By having the latest RF survey data as well as the predicted network data, the RRM optimization algorithms can be executed for each RRM time-slot. In some embodiments, the network data used in the RRM optimization arrangement only includes the AP traffic demand.

By having the RF scan data as well as the predicted network data, predictive RRM optimization algorithms can be executed for each scheduled RRM time-slot. To provide service differentiation among different APs 15 of the network, priority factors per AP 15 are also defined. The priority factors can be determined based on various criteria. Higher priority for an AP 15 means the RRM arrangement is willing to provide better service quality for the AP 15 and its clients. For instance, if the RRM algorithm optimizes the cooperating channels on the APs 15, the priority for an AP could mean having a better channel plan for the AP and the neighboring APs 15 such that there is minimum impact from co-channel neighboring APs 15. The same conclusion is true for other RRM configuration parameters including transmission power, beacon transmission rate, data transmission rate, MIMO settings, etc.

The service differentiable RRM optimization arrangement discussed herein includes the following advantages:
  The RRM optimization can provide service differentiation on a per AP basis by using priority factors in the predictive RRM optimization algorithms
  Service differentiation can be defined network wide not just ESS-wide.
  Operates based on network learning principles and optimizes the network by using the latest RF survey data as well as predicted network data.
  The RRM optimization is truly vendor agnostic.
  The RRM optimization is horizontally scalable.
  Low signaling and controlling overhead.
  Flexible for different network venues and traffic conditions.

As noted above, service differentiable RRM optimization arrangement is part of the manager, i.e., the RRM algorithms can be executed by the SON manager node 2, discussed herein with reference to FIG. 1. FIG. 1 shows a Wi-Fi SON manager node 2 architecture and its building components. The slicer 4 is responsible for clustering and segmenting the network into smaller clusters and segments. Each segment may contain a limited number of BSSs under control. The RRM optimizer 8 then optimizes the RRM configuration settings (e.g., transmit power or operating channel) per network segment. Segmentation is done such that different segments have minimum RF impact on each other. The slicer 4 is a component of the Wi-Fi solution that provides scalability up to the level of tens of millions of APs 15. The slicer functions to slice the controlled Wi-Fi network into multiple segments that are manageable by the RRM optimizer. The data collector 12 is responsible for collecting and smoothing the network statistics, traffic and network load data from the network for each segment and for each RRM time-slot, as well as collecting the RF survey data from each AP 15.

The RRM optimizer 8 includes and executes a set of RRM algorithms whose goal is to perform RRM optimizations for different RRM configuration parameters. The RRM optimizer 8 can use various optimization algorithms as it will be apparent to those skilled in the art. Using pro-active algorithms in the RRM optimizer 8 will provide a more scalable Wi-Fi solution. The RRM scheduler 6 is responsible for scheduling the RRM optimization performed by the RRM optimizer 8. The RRM scheduler 6 may control the efficiency of the whole RRM solution by avoiding performing unnecessary RRM optimization (which imposes processing overhead) and also by limiting the number of changes per AP 15. Too frequent RRM changes on one AP 15 is not favorable since this might result in outage as well as wireless device user service disruption. It is contemplated that the functions and processes described herein can be distributed over several physical nodes and/or devices. For example, the RRM optimizer 8 can be implemented so that the functions performed by the RRM optimizer 8 are distributed over multiple physical nodes, for example, multiple SON manager nodes 2 or other nodes. Such nodes for performing RRM optimization can be a node separate from an AP or a particular one or more AP nodes. In other words, embodiments are not limited to performing the RRM optimization in a dedicated SON manager node or even a SON manager node whose functions are distributed in a cloud environment.

The Wi-Fi architecture includes at least two interfaces:

Network data or other data interface 16: The SON manager node 2 collects network data from the network (APs) which are required to run RRM optimization algorithms. This includes without limitation RF scan reports from the APs 15, traffic load statistics, channel utilization statistics, AP static configuration parameters, etc. As used herein, "big data" refers to large data sets that may be analyzed computationally to reveal patterns, trends, and associations. As such, big data interface 16 refers to an interface used to collect large data sets over a predetermined size threshold where the threshold is not fixed and depends upon the particular implementation and design goals.

Bulk configuration interface 14: After executing the RRM optimization algorithms, the optimized RRM configuration parameters are sent to the APs 15 so that the APs 15 can updates their parameters. The manager 2 sends the bulk RRM configuration parameters using this interface.

The network slicer 4 segments the entire network which can be composed on tens of millions of APs 15, into smaller dense segments whose RF impact on each other is minimal. The RRM optimizer 8 then runs RRM optimization algorithms per segment to determine the optimal RRM configuration parameters per AP 15. To provide a scalable solution with per AP-differentiated service, a predictive optimization arrangement which can differentiate the optimization priorities of the APs 15 in the optimization algorithms is employed.

The notion of predictive and proactive RRM is based on the concept of having a periodic traffic load on the APs 15 of a WLAN. Therefore, RRM periods in the network are defined and the traffic pattern (e.g., volume, type and distribution) is highly correlated over different RRM periods. An example is an office building where employees come to work every 8 am and go for lunch between 12 pm-1 pm and leave the office around 5 pm. This pattern is repeated every day and thus the RRM period can be defined as one day. However, the RRM period can be defined as a week since the traffic pattern is different in week days and weekends. As it is observed in FIG. 2, during each RRM period the RRM time-slots can be defined, which determines the time granularity of perfuming RRM optimizations.

Figure 2:
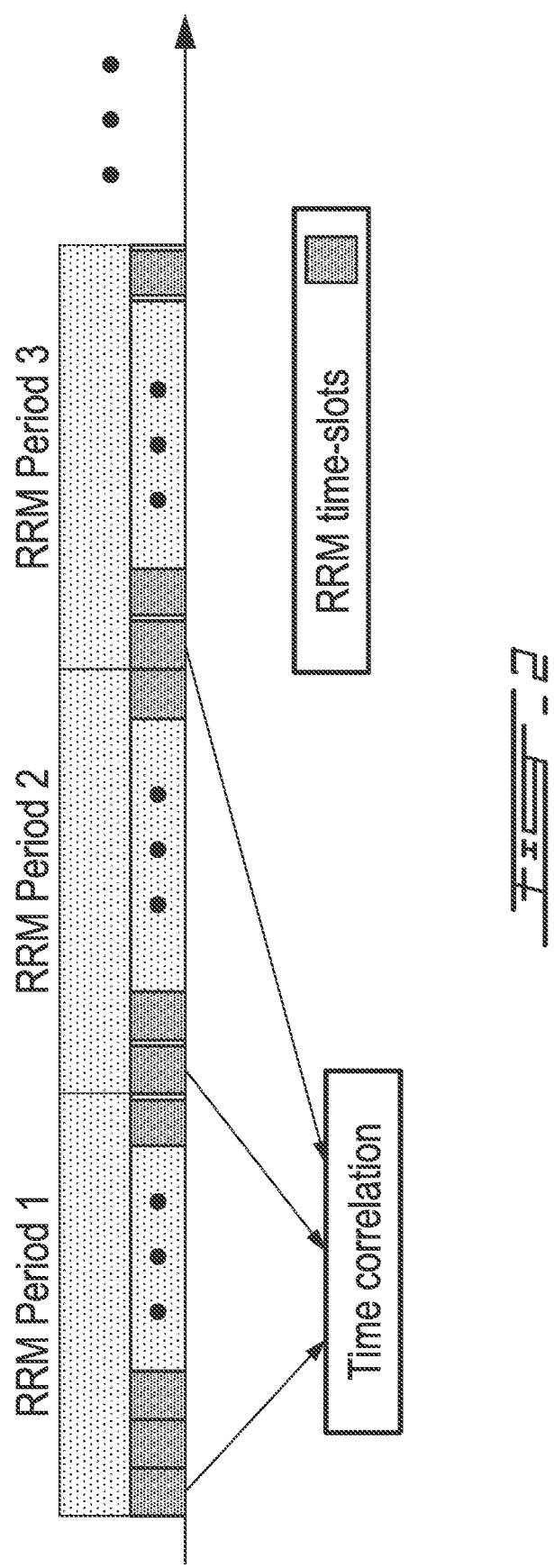
FIG. 2 is a timing diagram showing RRM optimization periods.

Time-slots are defined based on the processing capability of the RRM optimizer 8 as well as the bandwidth of the manager interfaces 14 and 16, system delay requirements and also traffic coherence time which is the duration of the time over which the traffic is assumed be correlated (does not have drastic changes). Note the time-slot duration is derived based on a trade-off among the above mentioned factors. An example of the RRM period is one week, i.e., assume that the traffic pattern is periodic with the period of one week. An example of a time-slot is one hour, i.e. RRM optimization is performed hourly. In this example it is assumed that the traffic patterns over every hour of the same day of the week over different weeks are correlated. FIG. 2 shows the notions of RRM period, RRM time-slot and correlation among the time-slots.

Network data is then collected by the data collector 12 for each RRM time-slot and then it is smoothed using an exponential moving averaging formula as follows:

$$S_t^i = \alpha * y_t^i + (1-\alpha) * S_{t-1}^i$$

where $S_t^i$ is the average value of a feature of the network data (e.g., AP 15 traffic volume) at time-slot i of RRM period t. Note that different features of the network data (other than traffic load) per AP 15 can be considered as an input to the predictive RRM solution. Parameter a determines the convergence speed of the moving averaging function and is called a "smoothing factor" which is chosen between 0 and 1. The above averaging is performed for each time slot for each AP 15. Assuming that the number of APs 15 in the network is N and the number of time-slots in each RRM period is M, the data collector 12 may only need to keep a matrix of size M×N for each network data feature. In one implementation, only total network traffic data per AP 15 is used. Network traffic data can be any network traffic parameter reflecting the load or demand of the APs 15. This can include the following:

Total Transmit/receive traffic demand;
Channel-time usage in percent (local, non-local and total channel occupancy);
Number of connected clients; or
Any network data and statistics representing a performance aspect of the network.

The scheduler 6 then schedules the RRM optimizations during each RRM period. Note that due to processor, e.g., central processing unit (CPU), efficiency and to avoid frequent RRM changes in the network, the scheduler 6 might choose only a limited number of RRM optimizations instead of performing a separate optimization for each time slot. In other words, the scheduler 6 is responsible for selecting a subset of RRM time-slots during an RRM period for RRM optimization. Choosing this set depends on the network operator policy as well processing and communication capabilities of the RRM solution (SON manager node 2), size of the network, etc. Scheduling is done for each segment of the network determined already by the network slicer 4.

The RRM optimizer 8 is then called to perform the RRM algorithms located in the RRM optimizer 8 for each segment of the network on the specified time-slots determined by the scheduler 6.

The inputs to the RRM optimizer 8 include the following:
The smoothed network traffic data Other network performance parameters including, AP PHY layer and MAC layer parameters, network performance statistics, channel time utilizations, etc.

RF survey data from the APs 15 (neighbor relationship vectors) containing the RSSI values of the links between each AP 15 and each of its neighbors Priority factor: specified by the operator to give priority to some selected APs 15 and providing service differentiation to those APs 15. Priority might be given to some APs 15 due to the following reasons:

Provide better service quality for gold customers (service differentiation per service class)

Priority to indoor and outdoor APs 15 in different seasons of the year, e.g., priority to outdoor in warm seasons and indoor in cold seasons.

Priority due to special events, e.g., black Friday, Boxing day, party events, etc.

Priority based on the type of the AP hardware

Priority based on the type of the AP software release

Priority based on the supporting 802.11 standard

Priority based on any environmental factors

Priority based on logistic and organizational policies.

The RRM optimizer 8 then runs a separate optimization for each network segment to determine the RRM configuration parameters for each AP 15. The priority factors can be selected from the bounded set of integer values (service classes in the network can be defined) or they can be any real value which can provide a per AP 15 service level differentiation. By giving separate priority factors to each AP 15 in the RRM execution phase, different RRM service quality for each AP 15 can be defined. As noted, service differentiation can be provided for AP classes or per AP basis. The optimization arrangement performs by optimizing an objective function (minimizing a cost function or maximizing a revenue function) over the entire segment. When prioritizing APs 15 in the RRM optimization execution, the priority factors may be multiplied to obtain the AP objective function contribution. Depending on the type of the objective function, the priorities can be positive or negative numbers. For instance, if maximizing a revenue function over the segment, a higher priority function means a better service provisioning for the APs 15, i.e., the APs 15 with higher priorities will get better service as their contribution in maximizing the revenue function will be higher than the normal APs 15.

WLAN networks are deployed by each operator independently and therefore there might exist several WLAN networks from multiple providers in the same geographical region. Note that the RF survey data for each AP contains the list of all the neighboring Wi-Fi APs 15 from all the operators. However, the data collector 12 only has access to the network traffic load information of the APs 15 managed by the network operator which runs the SON manager node 2. In other words, the SON manager node 2 does not have access to the traffic load information of the unmanaged APs 15 from other operators. In this case, the SON manager node 2 should estimate the traffic load of the unmanaged APs 15 to be used by the RRM optimizer 8. While different estimation methods can be considered, the following method of estimation may be implemented: The traffic load data for the unmanaged APs 15 can be estimated by averaging the traffic load data of managed APs 15 who are a neighbor of the unmanaged AP 15. In another embodiment, the unmanaged AP 15 load can be estimated based on the total average load of the APs 15 in the segments. In another embodiment, the AP 15 traffic load can be estimated by using the maximum load of a managed AP 15 in the segment. The same methodology can be extended to estimate other network data for unmanaged APs 15.

In another embodiment, the input to the RRM optimizer 8 can include a black list of the APs 15 for which RRM configuration changes are not allowed. In this case, the RRM optimizer 8 may take the traffic and RF survey data of such APs 15 into account in its RRM optimizations, but these APs 15 are treated as unmanaged APs 15 for which RRM configuration changes are not applied. Black lists are created for different reasons. For example, it may be desirable in some embodiments to avoid disruption of the traffic (especially real-time traffic) on these APs 15 when applying the RRM configuration changes. Another example is the case that the provider has different classes of service for one of which RRM service is not provided.

Some embodiments provide a scalable service differentiable RRM optimization arrangement. The arrangement uses a predictive RRM approach and using the priority factors it can provide per AP RRM service differentiation.

Figure 3:
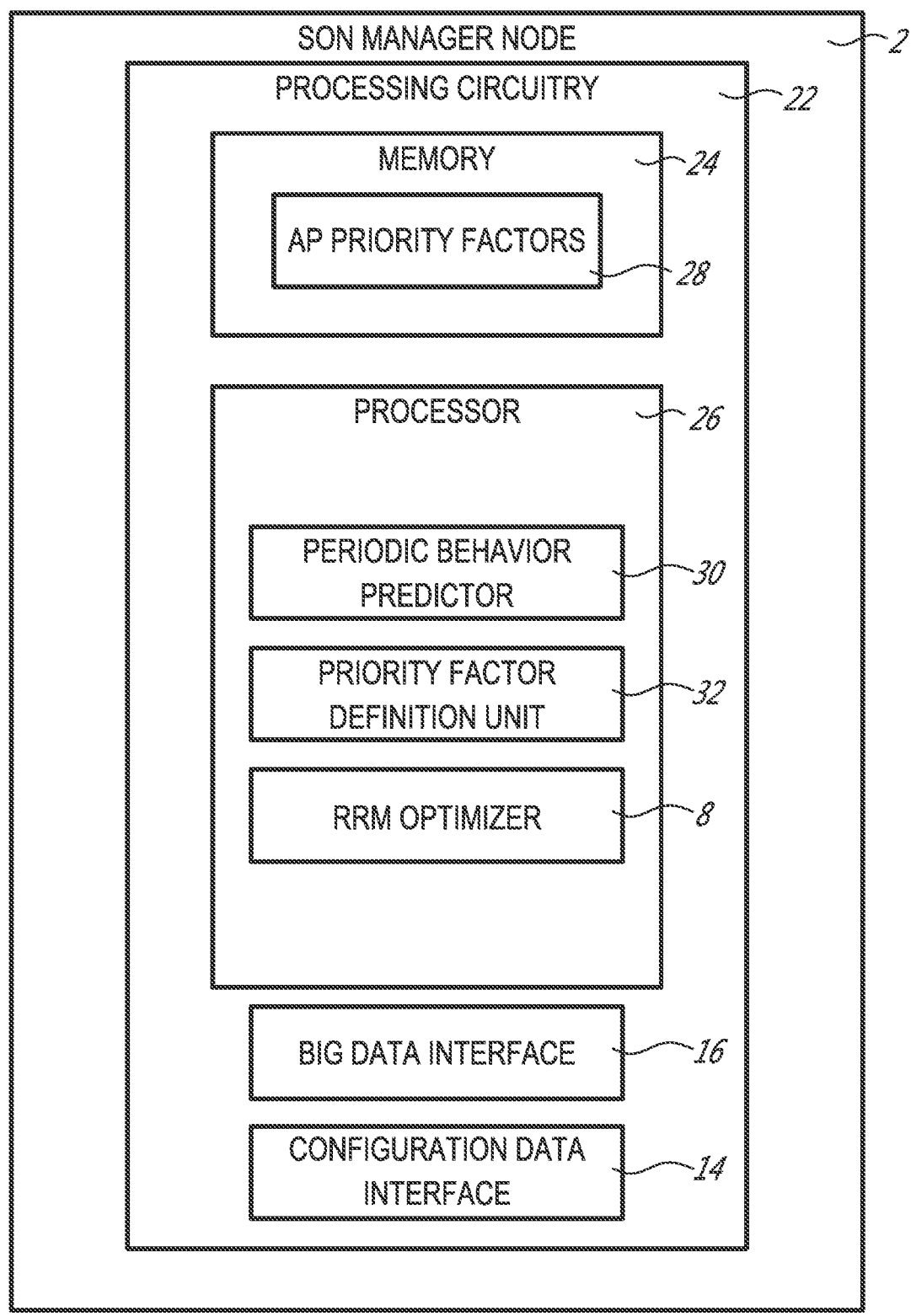
FIG. 3 is a block diagram of a SON manager node showing components associated with service differentiable RRM.

FIG. 3 is a block diagram of a SON manager node 2 constructed in accordance with some embodiments described herein. The node 2 includes processing circuitry 22. In some embodiments, the processing circuitry 22 may include a memory 24 and a processor 26, the memory 24 containing instructions which, when executed by the processor 26, configure processor 26 to perform the one or more functions described herein. In addition to a traditional processor and memory, processing circuitry 22 may comprise integrated circuitry for processing and/or control, e.g., one or more processors and/or processor cores and/or FPGAs (Field Programmable Gate Array) and/or ASICs (Application Specific Integrated Circuitry).

Processing circuitry 22 may comprise and/or be connected to and/or be configured for accessing (e.g., writing to and/or reading from) memory 24, which may comprise any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 24 may be configured to store code executable by control circuitry and/or other data, e.g., data pertaining to communication, e.g., configuration and/or address data of nodes, etc. Processing circuitry 22 may be configured to control any of the methods described herein and/or to cause such methods to be performed, e.g., by processor 26. Corresponding instructions may be stored in the memory 24, which may be readable and/or readably connected to the processing circuitry 22. In other words, processing circuitry 22 may include a controller, which may comprise a microprocessor and/or microcontroller and/or FPGA (Field-Programmable Gate Array) device and/or ASIC (Application Specific Integrated Circuit) device. It may be considered that processing circuitry 22 includes or may be connected or connectable to memory, which may be configured to be accessible for reading and/or writing by the controller and/or processing circuitry 22.

The memory 24 is configured to store AP priority factors. The processor 26 is configured to define the AP priority factors based on predefined criteria. The predefined criteria may include at least one of service class, annual seasons, special events, AP hardware, AP software version, standard specifications, environmental factors, logistic and organizational policies. The processor 26 is also configured to perform the functions of RRM optimization by the RRM optimizer 8. The RRM optimization is based on priority factors generated by a priority factor definition unit 32 to provide a measure of service to an AP 15 that depends on a priority factor associated with the AP 15. In some embodiments, the measure of service increases with increasing priority factor. In some embodiments, the big data interface 16 receives survey data from a plurality of APs 15. The survey data, as well as predicted periodic behavior predicted y the periodic behavior predictor 30, are used in the RRM optimization process performed by the RRM optimizer 8. An output of the RRM optimizer 8 is configuration data sent to the APs 15 via the configuration data interface 14 to configure the APs 15 according to levels of service based on the priority factors.

Figure 4:
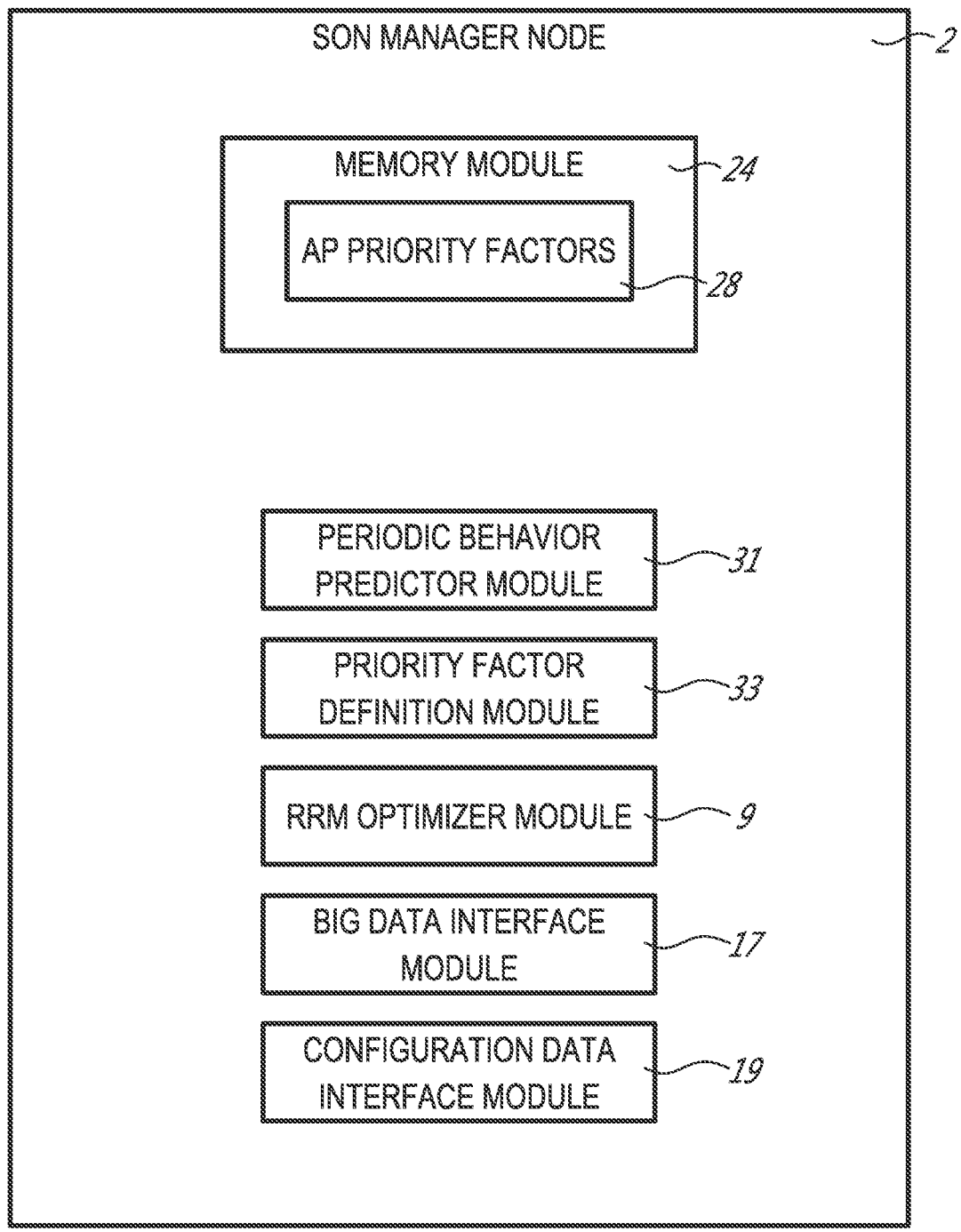
FIG. 4 is a block diagram of an alternative embodiment of the SON manager node.

FIG. 4 is a block diagram of an alternative embodiment of the SON manager node 2, where the functions of the SON manager node 2 are performed by a processor operating according to computer instructions contained in software modules. The SON manager node 2 of FIG. 4 includes the memory module 24 that stores AP 15 priority factors. A periodic behavior predictor module 31 has software that causes the processor to predict behavior of APs 15 which may be based on historical data. A priority factor definition module 33 has software that causes the processor to define priority factors for the APs 15. The RRM optimizer module 9 has software that causes the processor to perform an RRM optimization based at least on the priority factors. The data interface module 17 may be a combination of software and hardware configured to receive survey data, such as big data, from the APs 15. The configuration data interface module 19 may be a combination of hardware and software configured to send configuration data based on the RRM optimization to the APs 15.

FIG. 5 is a flowchart of an exemplary process for providing service differentiable RRM in a WLAN. The process includes defining access point, AP 15, priority factors based on predefined criteria (block S100). The process also includes performing an RRM optimization based on the priority factors, the optimization providing a measure of service to an AP 15 that depends on a priority factor associated with the AP (block S102). The process further includes sending configuration data to the APs 15 based on the RRM optimization (block S104).

Some embodiments include:

Embodiment 1. A method for use in a node to provide service differentiable radio resource management, RRM, in a wireless communication network, the method comprising:
defining access point, AP, priority factors based on predefined criteria;
performing an RRM optimization based on the priority factors, the optimization providing a measure of service to an AP that depends on a priority factor associated with the AP; and
sending configuration data to the APs based on the RRM optimization.

Embodiment 2. The method of Embodiment 1, further comprising:
receiving survey data from a plurality of APs;
determining a predictive periodic behavior of the wireless communication network; and
wherein performing the RRM optimization is further based on the survey data and the predictive periodic behavior.

Embodiment 3. The method of Embodiment 1, wherein the predefined criteria includes at least one of service class, annual seasons, special events, AP hardware, AP software version, standard specifications, environmental factors, logistic and organizational policies.

Embodiment 4. The method of Embodiment 1, wherein the RRM optimization includes one of minimizing a cost function and maximizing a revenue function over a plurality of APs based on the priority factors and traffic load information.

Embodiment 5. The method of Embodiment 4, wherein the traffic load information is estimated for at least one AP not managed by an operator hosting the manager node.

Embodiment 6. The method of Embodiment 4, wherein the estimation of traffic load information for an AP is based on at least one of an average of traffic load information of other APs, and a maximum load of another AP, for which traffic load information is determinable.

Embodiment 7. The method of Embodiment 1, wherein a blacklist of APs for which RRM configuration changes are not allowed is maintained.

Embodiment 8. The method of Embodiment 1, wherein the node is a self-organizing, SON, manager node.

Embodiment 9. A node configured to provide service differentiable radio resource management, RRM, in a wireless communication network, the node comprising:
processing circuitry including a memory and a processor:
the memory configured to store access point, AP, priority factors; and
the processor configured to:
define AP priority factors based on predefined criteria;
perform an RRM optimization based on the priority factors, the optimization providing a measure of service to an AP that depends on a priority factor associated with the AP; and
send configuration data to the APs based on the RRM optimization.

Embodiment 10. The node of Embodiment 8, wherein the processor is further configured to:
receive survey data from a plurality of APs; and
determine a predictive periodic behavior of the wireless communication network;
wherein the performing the RRM optimization is further based on the survey data and the predictive periodic behavior.

Embodiment 11. The node of Embodiment 8, wherein the predefined criteria includes at least one of service class, annual seasons, special events, AP hardware, AP software version, standard specifications, environmental factors, logistic and organizational policies.

Embodiment 12. The node of Embodiment 8, wherein the RRM optimization includes one of minimizing a cost function and maximizing a revenue function over a plurality of APs based on the priority factors and traffic load information.

Embodiment 13. The node of Embodiment 11, wherein the traffic load information is estimated for at least one AP.

Embodiment 14. The node of Embodiment 12, wherein the estimation of traffic load information for an AP is based on at least one of an average of traffic load information of other APs, and a maximum load of another AP, for which traffic load information is determinable.

Embodiment 15. The node of Embodiment 8, wherein a blacklist of APs for which RRM configuration changes are not allowed is maintained.

Embodiment 16. The node of Embodiment 1, wherein the node is a self-organizing, SON, manager node.

Embodiment 17. A node configured to provide service differentiable radio resource management, RRM, in a wireless communication network, the node comprising:
a priority factor definition module configured to define AP priority factors based on predefined criteria;

an RRM optimizer module configured to perform an RRM optimization based on the priority factors, the RRM optimization providing a measure of service to an AP that depends on a priority factor associated with the AP; and a configuration data interface module configured to send configuration data to the APs based on the RRM optimization.

Embodiment 18. The node of claim 14, further comprising:

a data interface module configured to receive survey data from a plurality of APs; and a periodic behavior prediction module configured to determine a predictive periodic behavior of the wireless communication network; wherein the RRM optimization is further based on the survey data and the predictive periodic behavior.

ABBREVIATION EXPLANATION

AP Access Point
CSMA/CA Carrier Sensing Multiple Access/Collision Avoidance
DL Downlink
MAC Medium Access Control
PHY Physical layer
STA IEEE 802.11 station
UL Uplink
WLAN Wireless Local Area Network
RRM Radio Resource Management
SON Self-Organizing Network
ACC AP Channel Capacity
KPI Key Performance Indicator
Tx Transmit
Rx Receive
BSS Basic Service Set
RF Radio Frequency
RSSI Received Signal Strength Identifier As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, some embodiments of the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of some embodiments of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings which are limited only by the following claims.

What is claimed is:

1. A method for use in a node to provide service differentiable radio resource management, RRM, in a wireless communication network, the method comprising:

defining RRM periods and access point, AP, priority factors based on predefined criteria, wherein said AP priority factors are a set of integer values or real values, and wherein, for each RRM period, one or more RRM time-slots are defined for performing RRM optimizations;

scheduling RRM optimizations for each RRM period, wherein the scheduling comprises selecting a subset of RRM time-slots during an RRM period for performing RRM optimization;

performing RRM optimization, in the selected subset of RRM time-slots, based on the priority factors, the RRM optimization providing a measure of RRM service to an AP that depends on a priority factor associated with the AP, wherein the measure of RRM service indicates an RRM service quality for the AP, and wherein the RRM service quality increases with increasing priority factor; and sending configuration data to the APs based on the RRM optimization.

2. The method of claim 1, further comprising:
receiving survey data from a plurality of APs;
determining a predictive periodic behavior of the wireless communication network; and
wherein performing the RRM optimization is further based on the survey data and the predictive periodic behavior.

3. The method of claim 1, wherein the predefined criteria includes at least one of service class, annual seasons, special events, AP hardware, AP software version, standard specifications, environmental factors, logistic and organizational policies.

4. The method of claim 1, wherein the RRM optimization includes one of minimizing a cost function and maximizing a revenue function over a plurality of APs based on the priority factors and traffic load information.

5. The method of claim 4, wherein the traffic load information is estimated for at least one AP not managed by an operator hosting a manager node.

6. The method of claim 4, wherein the estimation of traffic load information for an AP is based on at least one of an average of traffic load information of other APs, and a maximum load of another AP, for which traffic load information is determinable.

7. The method of claim 1, wherein a blacklist of APs for which RRM configuration changes are not allowed is maintained.

8. The method of claim 1, wherein the node is a self-organizing, SON, manager node.

9. A node configured to provide service differentiable radio resource management, RRM, in a wireless communication network, the node comprising:
processing circuitry including a memory and a processor:
the memory configured to store access point, AP, priority factors; and
the processor configured to:
define RRM periods and AP priority factors based on predefined criteria, wherein said AP priority factors are a set of integer values or real values, and wherein, for each RRM period, the processor is configured to define one or more RRM time-slots for performing RRM optimizations;
schedule RRM optimizations for each RRM period, wherein, for the scheduling, the processor is configured to select a subset of RRM time-slots during an RRM period for performing RRM optimization;
perform RRM optimization, in the selected subset of RRM time-slots, based on the priority factors, the RRM optimization providing a measure of RRM service to an AP that depends on a priority factor associated with the AP, wherein the measure of RRM service indicates an RRM service quality for the AP, and wherein the RRM service quality increases with increasing priority factor; and
send configuration data to the APs based on the RRM optimization.

10. The node of claim 9, wherein the processor is further configured to:
receive survey data from a plurality of APs; and
determine a predictive periodic behavior of the wireless communication network;
wherein the performing the RRM optimization is further based on the survey data and the predictive periodic behavior.

11. The node of claim 9, wherein the predefined criteria includes at least one of service class, annual seasons, special events, AP hardware, AP software version, standard specifications, environmental factors, logistic and organizational policies.

12. The node of claim 9, wherein the RRM optimization includes one of minimizing a cost function and maximizing a revenue function over a plurality of APs based on the priority factors and traffic load information.

13. The node of claim 12, wherein the traffic load information is estimated for at least one AP.

14. The node of claim 13, wherein the estimation of traffic load information for an AP is based on at least one of an average of traffic load information of other APs, and a maximum load of another AP, for which traffic load information is determinable.

15. The node of claim 9, wherein a blacklist of APs for which RRM configuration changes are not allowed is maintained.

16. The node of claim 9, wherein the node is a self-organizing, SON, manager node.

* * * * *